Nov. 14, 1967
P. A. MANKIN ETAL
3,352,582
SWIVEL TYPE HOSE CLAMP FOR CONNECTION TO THE HOSE
OF A GASOLINE DISPENSING APPARATUS
Filed Sept. 12, 1966
2 Sheets-Sheet 1
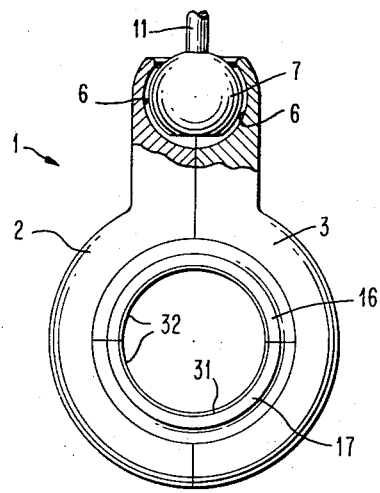
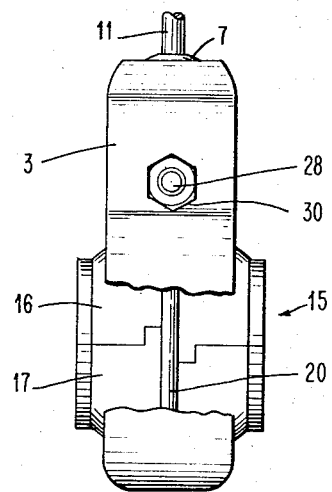
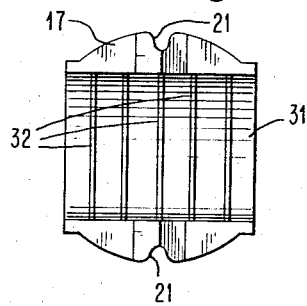
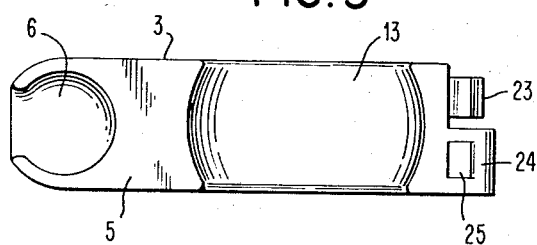
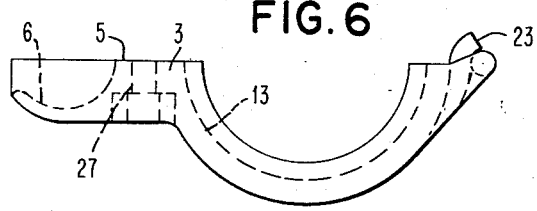
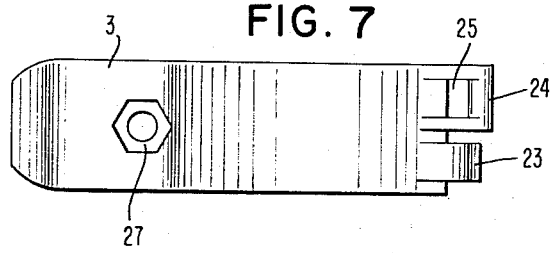
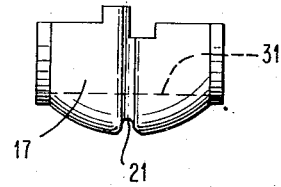
INVENTORS
PAUL A. MANKIN
LOWELL F. NELSON
BY
ATTORNEY

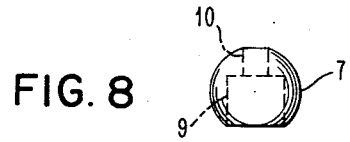
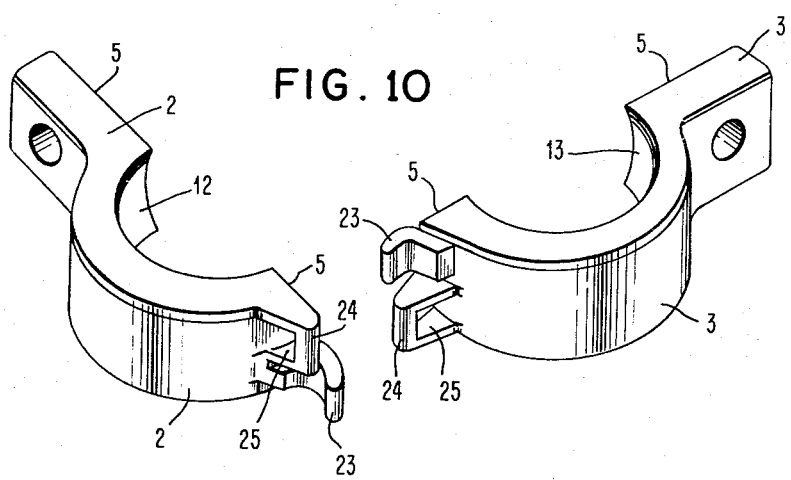
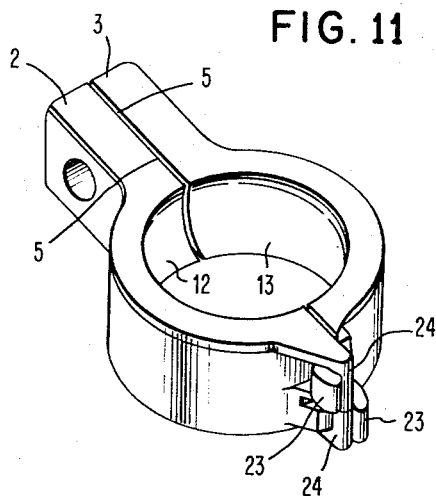
INVENTORS
PAUL A. MANKIN
LOWELL F. NELSON
ATTORNEY

United States Patent Office 3,352,582
Patented Nov. 14, 1967

3,352,582
SWIVEL TYPE HOSE CLAMP FOR CONNECTION TO THE HOSE OF A GASOLINE DISPENSING APPARATUS
Paul A. Mankin, North Muskegon, and Lowell F. Nelson, Muskegon, Mich., assignors to John Wood Company, East Orange, N.J., a corporation of Delaware
Filed Sept. 12, 1966, Ser. No. 579,459
3 Claims. (Cl. 287—89)

ABSTRACT OF THE DISCLOSURE

The invention relates to a hose clamp of two separable half sections having segmental spherical sockets at each end, one of which receives a flexible cable with a ball and the other of which receives two grooved segmental spherical hose clamp sections held by a snap ring positioned in said groove.

---

Our invention relates to a swivel type of hose clamp for the dispensing hose of a gasoline dispensing apparatus of the type commonly used in service stations, the swivel type hose clamp being provided with means for securing the clamp around the hose and for securely holding the outer end of a flexible cable, such as a nylon cable. The inner end of the flexible cable is adapted to be connected to a retracting cable reel positioned within the housing of the gasoline dispensing apparatus.

In recent years, most gasoline dispensing apparatus manufactured and sold has been of a considerably lower height than in the previous twenty-five or thirty years, or so. Such lower height of design of gasoline dispensing apparatus has necessitated that the dispensing hose outside of the housing be held positioned in loops, until extended by an attendant, to prevent a substantial portion of the hose from reaching down to and lying on the island on which such gasoline dispensing apparatus is positioned.

One object of our invention is to provide a hose clamp of a swivel type so that the flexible cable, connected at one end to a reel within the housing of the gasoline dispensing apparatus and at the other end to the clamp, can swivel, and thus help eliminate "figure 8-ing" of the hose. If such "figure 8-ing" does occur, it can be readily corrected by turning the hose in the hose clamp.

Another object of our invention is to provide a swivel type hose clamp that may be readily assembled, and disassembled, by unskilled labor.

Another feature of our invention is that our improved swivel hose clamp may be made very economically, because of its simplicity of design with a minimum of parts.

Another feature of our invention is to provide a hose clamp which may be formed of molded plastic parts.

Our invention includes the various novel features of construction and arrangement hereinafter more definitely specified with reference to the accompanying drawings. In said drawings:

FIG. 1 is a front elevation, partly in section, showing our improved swivel type hose clamp.

FIG. 2 is a side elevation, partly broken away, of the structure shown in FIG. 1.

FIG. 3 is an elevation view of one-half of the hose clamping portion shown in FIG. 2.

FIG. 4 is a front elevation, at right angles to FIG. 3, of the structure shown in FIG. 3.

FIG. 5 is an inside elevation of one of the outer portions of the two halves of the structure shown in FIG. 1.

FIG. 6 is an elevation view of the structure shown in FIG. 5.

FIG. 7 is an elevation of the outside of the structure shown in FIG. 5.

FIG. 8 is an elevation of the ball retaining means for a flexible cable, said ball retaining means, with a portion of flexible cable extending therefrom, being shown in FIG. 1.

FIG. 9 is an inner end elevation of the structure shown in FIG. 8.

FIG. 10 is an exploded view of the two halves of the outer portion of the swivel clamp shown in FIG. 1.

FIG. 11 is a perspective view of the two half portions of the clamp, shown in FIG. 10, in assembled position.

Referring to said drawings, the swivel hose clamp indicated generally at 1 includes the two outer sections 2 and 3. Each of said outer sections includes an inside plane surface 5. Each of said outer sections 2 and 3 includes a generally semicylindrical hollow portion 6 adapted to house the substantially spherical ball member 7.

The ball member 7 is provided with a cylindrical opening 9 and a reduced diameter cylindrical opening 10, as best shown in FIGS. 8 and 9. The flexible cable 11, indicated in FIGS. 1 and 2, is pushed through the reduced diameter opening 10 and, conveniently, securely knotted at the end, the knot being positioned in the opening 9. The other end of the flexible cable 11 is connected to a cable reel (not shown) within the housing of the gasoline dispensing apparatus. The two sections 2 and 3 are provided with a general hemispherical recess indicated, respectively, at 12 and 13 in FIGS. 10, 11, 5, and 6. The swivel member indicated generally at 15, is comprised of two complementary half sections 16 and 17 which are held together by means of a snap ring 20 engaged in the annular grooves 21 formed in the outer surfaces of the members 16 and 17.

Each of the two outer sections 2 and 3 is provided with a tongue portion 23 and a portion 24 provided with an opening 25, as best shown in FIGS. 10, 5, and 7.

As best shown in FIG. 11, the two outer sections 2 and 3 are assembled together by the tongue member 23 of the outer section 2 being engaged in the opening 25 in the member 24 of the outer member 3. Correspondingly the tongue member 23 of the outer section 3 is engaged in the opening 25 of the member 24 of the outer member 2.

The members 2 and 3 are provided at their upper end below the general semi-cylindrical hollow portions 6 with an opening 27 for a screw 28 which is engaged at its outer end in the nut 30, to securely hold the two outer sections 2 and 3 together in rigid relationship.

We find it convenient to mold said outer sections 2 and 3, said ball member 7, and the swivel members 16 and 17 of suitable plastic material.

The cylindrical opening 31 through the members 16 and 17, when assembled as shown in FIGS. 1 and 2, is provided with a series of ribs 32 to effect better gripping surface for the dispensing hose (not shown) of the gasoline dispensing apparatus when clamped in position around said dispensing hose and securely tightened thereto by means of the snap ring 20.

When it is desired to install our improved swivel type of hose clamp around a dispensing hose of a gasoline dispensing apparatus, the screw 28 is removed from its securing nut 30, and the outer sections 2 and 3, with their respective swivel members 16 and 17 are opened up. The members 16 and 17 are first positioned around the dispensing hose and secured thereto by means of the snap ring 20 engaged in the grooves 21, to hold said members 16 and 17 in tight gripping engagement with the dispensing hose. The flexible cable 11 is then inserted through the opening 10 of the ball member 7, and securely knotted at its inner end, with the knot being positioned within the enlarged opening 9 of the ball member 7.

The ball member 7 is then positioned within one of the two semi-hemispherical hollow portions 6 of either of the members 2 or the member 3, and the two outer sections 2 and 3 pivotally moved into position with their plane surfaces 5 in engagement with each other. The screw 28 is then inserted through the opening 27 in the two outer sections 2 and 3, and the screw 28 rigidly secured in its nut 30 to hold the outer sections assembled rigidly together, and with the members 16 and 17 free to rotate and move within their respective portions 12 and 13 of the outer sections 2 and 3.

We do not desire to limit ourselves to specific details of construction herein set forth, as it is obvious that various modifications may be made in our invention without departing from the essential features thereof.

We claim:

1. A swivel type hose clamp comprising two counterpart outer half sections, said half sections having inner surfaces adapted to be adjacent each other when said clamp is assembled; a substantially hemispherical recess at one end of each of said outer half sections, said two substantially hemispherical recesses forming a substantial spherical recess when said outer half sections are assembled together; a substantially spherical ball member of an outer diameter adapted to fit with freedom of movement in said substantially spherical recess of said outer half sections; an opening in said substantially spherical ball means adapted to receive the outer end of a flexible cable and a second larger communicating opening adapted to receive and hold the outer end of said flexible cable; matching spherically curved recesses in each of said outer half sections; two counterpart hollow hose clamp sections forming a substantially spherical outer surface and a cylindrical inner opening therethrough when assembled together, said cylindrical inner opening being adapted to fit tightly around the dispensing hose of a gasoline dispensing apparatus, and said substantially spherical outer surface of said hose clamp sections being adapted to fit with freedom of turning movements in said substantially spherically curved recess of said outer half sections; a groove around the outer surfaces of said hose clamp sections; and a snap ring positioned in said groove for holding said hollow hose clamp sections tightly clamped around the outer surface of said dispensing hose.

2. A swivel type hose clamp comprising two counterpart outer half sections, said half sections having inner surfaces adapted to be adjacent each other when said clamp is assembled; a substantially hemispherical recess at one end of each of said outer half sections, said two substantially hemispherical recesses forming a substantial spherical recess when said outer half sections are assembled together; a substantially spherical ball member of an outer diameter adapted to fit with freedom of movement in said substantially spherical recess of said outer half sections; an opening in said substantially spherical ball means adapted to receive the outer end of a flexible cable and a second larger communicating opening adapted to receive and hold the knotted outer end of said flexible cable; matching spherically curved recesses in each of said outer half sections; two counterpart hollow hose clamp sections forming a substantially spherical outer surface and a cylindrical inner opening therethrough when assembled together, said cylindrical inner opening being adapted to fit tightly around the dispensing hose of a gasoline dispensing apparatus, and said substantially spherical outer surface of said hose clamp sections being adapted to fit with freedom of turning movement in said substantially spherically curved recesses of said outer half sections; a groove around the outer surfaces of said hose clamp sections; a snap ring positioned in said groove for holding said hollow hose clamp sections tightly clamped around the outer surface of said dispensing hose; and a tongue member and an open slot at the other end of each of said outer half sections, the tongue member of each outer half section adapted to be pivotally positioned in the open slot of the said other outer half section.

3. A swivel type hose clamp comprising two counterpart outer half sections, said half sections having inner plane surfaces adapted to be adjacent each other when said clamp is assembled; a substantially hemispherical recess at one end of each of said outer half sections, said two substantially hemispherical recesses forming a substantial spherical recess when said outer half sections are assembled together; a substantially spherical ball member of an outer diameter adapted to fit with freedom of movement in said substantially spherical recess of said outer half sections; an opening in said substantially spherical ball means adapted to receive the outer end of a flexible cable and a second larger communicating opening adapted to receive and hold the outer end of said flexible cable; matching spherically curved recesses in each of said outer half sections; two counterpart hollow hose clamp sections forming a substantially spherical outer surface and a cylindrical inner opening therethrough when assembled together, said cylindrical inner opening being adapted to fit tightly around the dispensing hose of a gasoline dispensing apparatus, and said substantially spherical outer surface of said hose clamp sections being adapted to fit with freedom of turning movements in said substantially spherically curved recesses in said outer half sections; a groove around the outer surfaces of said hose clamp sections; a snap ring positioned in said groove for holding said hollow hose clamp sections tightly clamped around the outer surface of said dispensing hose; a tongue member and an open slot at the other end of each of said outer half sections, the tongue member of each outer half section adapted to be pivotally positioned in the open slot of the said other outer half section; and means for holding said two outer half sections together with their said respective inner plane surfaces in engaging contact.

References Cited

UNITED STATES PATENTS

| 259,957 | 6/1822 | White | 287—12 X |
| 422,945 | 3/1890 | Jones | 287—91 X |
| 485,033 | 10/1892 | Hanna | 287—87 X |
| 493,719 | 3/1893 | Henderson | 248—75 |
| 1,543,037 | 6/1925 | Teeter | 287—12 |
| 1,679,414 | 8/1928 | Elsey | 287—87 X |
| 3,143,367 | 8/1964 | MacDonnell | 287—92 |

CARL W. TOMLIN, *Primary Examiner.*

A. V. KUNDRAT, *Assistant Examiner.*